United States Patent
Chauvel et al.

(10) Patent No.: US 7,493,476 B2
(45) Date of Patent: Feb. 17, 2009

(54) METHOD AND SYSTEM FOR OBTAINING AN IMMEDIATE OPERAND OF A BYTECODE FOR USE BY A MICRO-SEQUENCE

(75) Inventors: Gerard Chauvel, Antibes (FR); Jean-Philippe Lesot, Etrelles (FR); Gilbert Cabillic, Brece (FR)

(73) Assignee: Texas Instruments Incorporated, Dallas, TX (US)

( * ) Notice: Subject to any disclaimer, the term of this patent is extended or adjusted under 35 U.S.C. 154(b) by 380 days.

(21) Appl. No.: 11/188,827

(22) Filed: Jul. 25, 2005

(65) Prior Publication Data
US 2006/0026391 A1    Feb. 2, 2006

(30) Foreign Application Priority Data
Jul. 27, 2004    (EP)    .................. 04291918

(51) Int. Cl.
*G06F 9/22*    (2006.01)
(52) U.S. Cl. ..................................... 712/220
(58) Field of Classification Search ................. 712/208, 712/210, 211, 215, 226, 220, 245
See application file for complete search history.

(56) References Cited

U.S. PATENT DOCUMENTS

| 4,312,034 | A | * | 1/1982 | Gunter et al. | ............... 712/245 |
| 5,390,311 | A | * | 2/1995 | Fu et al. | ..................... 711/215 |
| 5,796,972 | A | * | 8/1998 | Johnson et al. | ............. 712/208 |
| 5,983,337 | A | * | 11/1999 | Mahalingaiah et al. | ........ 712/32 |
| 6,021,469 | A | | 2/2000 | Tremblay et al. | |
| 6,298,434 | B1 | | 10/2001 | Lindwer | |
| 6,385,764 | B1 | | 5/2002 | Blandy et al. | |
| 6,412,108 | B1 | | 6/2002 | Blandy et al. | |
| 6,965,984 | B2 | * | 11/2005 | Seal et al. | ................... 712/209 |

\* cited by examiner

*Primary Examiner*—David J Huisman
(74) *Attorney, Agent, or Firm*—Ronald O. Neerings; Wade James Brady, III; Frederick J. Telecky, Jr.

(57) ABSTRACT

A processor is provided that includes decode logic coupled to an instruction cache and a micro-sequence vector table including entries for each bytecode in an instruction set of the processor. The processor also includes a register coupled to the decode logic, wherein the register is dedicated for storage of an immediate operand of a bytecode. The decode logic is configured to obtain a single bytecode from the instruction cache, wherein the single bytecode requires an immediate operand stored in the instruction cache, use the single bytecode to locate an entry corresponding to the bytecode in the micro-sequence vector table, and, when indicated by information in the entry, obtain the immediate operand from the instruction cache and store the immediate operand in the register for use by a micro-sequence that is executed in lieu of the single bytecode.

16 Claims, 3 Drawing Sheets

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | GENERAL PURPOSE (GP) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE (GP) |
| R9 | GENERAL PURPOSE (GP) |
| R10 | GENERAL PURPOSE (GP) |
| R11 | GENERAL PURPOSE (GP) |
| R12 | GENERAL PURPOSE (GP) |
| R13 | GENERAL PURPOSE (GP) |
| R14 | GENERAL PURPOSE (GP) |
| R15 | STATUS AND CONTROL (ST) |

METHOD AND SYSTEM FOR OBTAINING AN IMMEDIATE OPERAND OF A BYTECODE FOR USE BY A MICRO-SEQUENCE

CROSS-REFERENCE TO RELATED APPLICATIONS

This application claims priority to European Patent Application No. 04291918.3, filed on Jul. 27, 2004 and incorporated herein by reference. This application is related to co-pending and commonly assigned application Ser. No. 11/188,311, entitled, "Automatic Operand Load, Modify And Store," which is incorporated by reference herein.

BACKGROUND

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and is as efficient as possible. Improvements in this area are desirable.

BRIEF SUMMARY

Disclosed herein is a technique for automatically loading and storing operands such that the efficiency of the electronic device is improved. An illustrative embodiment of the invention may comprise a processor that comprises a decode logic coupled to a first storage unit and further comprises a data structure. The processor also comprises a second storage unit coupled to the decode logic. The decode logic obtains a single instruction from the first storage unit and, if indicated by a first bit in the data structure, processes a group of instructions in lieu of the single instruction, the single instruction requiring an operand. If indicated by a second bit in the data structure, the decode logic obtains the operand from the first storage unit and stores the operand to the second storage unit for use by the group of instructions.

Another illustrative embodiment may comprise an electronic device that comprises a decode logic coupled to a first storage unit and a second storage unit. The electronic device also comprises a data structure comprising a plurality of entries, at least one entry having a corresponding instruction. The entry comprises a first field indicating whether a group of instructions is to be processed in lieu of the corresponding instruction. The entry also comprises a second field indicating a size of an operand required by the corresponding instruction. The decode logic obtains the operand from the first storage unit using the second field and stores the operand to the second storage unit for use by the group of instructions.

Yet another illustrative embodiment may comprise a method that comprises fetching a single instruction using a decode logic that comprises a data structure, where the decode logic is coupled to a first storage unit and a second storage unit. The single instruction requires an operand. The method also comprises, if indicated by a first field in the data structure, processing a group of instructions in lieu of the single instruction. The method further comprises obtaining the operand from the first storage unit, where a size of the operand is indicated by a second field in the data structure. The method further still comprises storing the operand in the second storage unit for use by the group of instructions.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor. The processor described herein is particularly suited for executing Java™ Bytecodes or comparable code. As is well known, Java is particularly suited for embedded applications. Java is a stack-based language, meaning that a processor stack is heavily used when executing various instructions (e.g., Bytecodes), which instructions generally have a size of 8 bits. Java is a relatively "dense" language meaning that on average each instruction may perform a large number of functions compared to various other instructions. The dense nature of Java is of particular benefit for portable, battery-operated devices that preferably include as little memory as possible to save space and power. The reason, however, for executing Java code is not material to this disclosure or the claims which follow. Further, the processor advantageously includes one or more features that permit the execution of the Java code to be accelerated.

Figure 1:
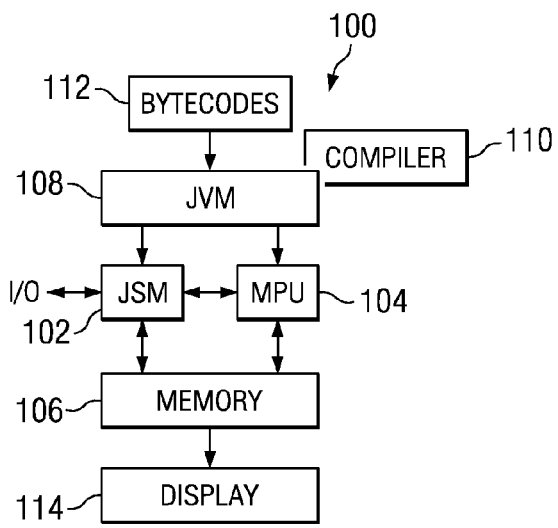
FIG. 1 shows a diagram of a system in accordance with preferred embodiments of the invention and including a Java Stack Machine ("JSM") and a Main Processor Unit ("MPU"), in accordance with embodiments of the invention.

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The MPU 104 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired for various applications.

As is generally well known, Java code comprises a plurality of "Bytecodes" 112. Bytecodes 1 12 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown) which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, Bytecode verifier, garbage collector, and a Bytecode interpreter loop to interpret the Bytecodes that are not executed on the JSM processor 102.

In accordance with preferred embodiments of the invention, the JSM 102 may execute at least two types of instruction sets. One type of instruction set may comprise standard Java Bytecodes. As is well-known, Java is a stack-based programming language in which instructions generally target a stack. For example, an integer add ("IADD") Java instruction pops two integers off the top of the stack, adds them together, and pushes the sum back on the stack. A "simple" Bytecode instruction is generally one in which the JSM 102 may perform an immediate operation either in a single cycle (e.g., an "iadd" instruction) or in several cycles (e.g., "dup2_x2"). A "complex" Bytecode instruction is one in which several memory accesses may be required to be made within the JVM data structure for various verifications (e.g., NULL pointer, array boundaries). As will be described in further detail below, the execution of one or more of the complex Bytecodes may be replaced by the execution of a "micro-sequence" comprising various other instructions.

Another type of instruction set executed by the JSM 102 may include instructions other than standard Java instructions. In accordance with at least some embodiments of the invention, the other instruction set may include register-based and memory-based operations to be performed. This other type of instruction set generally complements the Java instruction set and, accordingly, may be referred to as a complementary instruction set architecture ("C-ISA"). By complementary, it is meant that the execution of a complex Java Bytecode may be replaced by the execution of a "micro-sequence" comprising C-ISA instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM 102 generally comprises a stack-based architecture for efficient and accelerated execution of Java Bytecodes combined with a register-based architecture for executing register and memory based C-ISA instructions. Both architectures preferably are tightly combined and integrated through the C-ISA. Because various of the data structures described herein are generally JVM-dependent and thus may change from one JVM implementation to another, the software flexibility of the micro-sequence provides a mechanism for various JVM optimizations now known or later developed.

Figure 2:
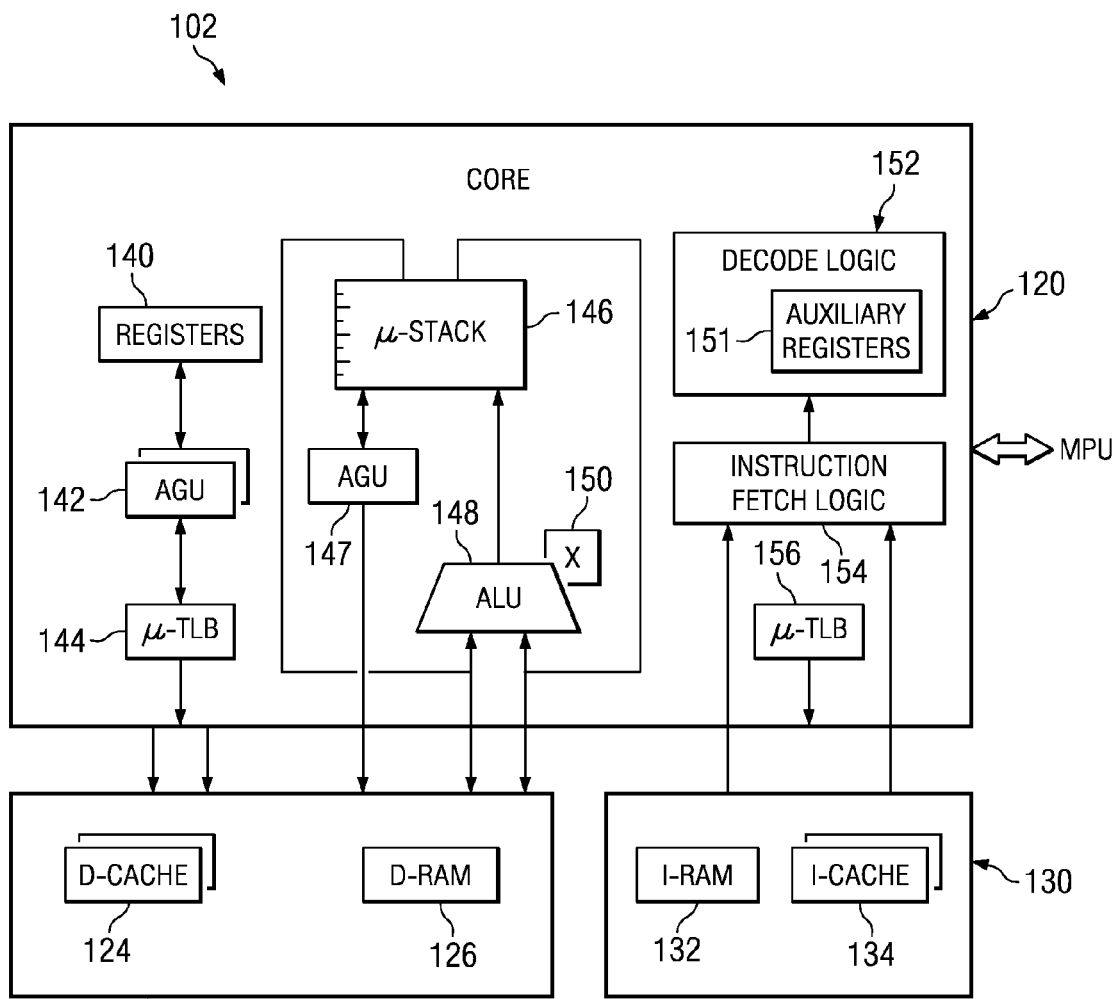
FIG. 2 shows a block diagram of the JSM of FIG. 1 in accordance with preferred embodiments of the invention.

FIG. 2 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146 and processed by the ALU 148, while instructions may be fetched from instruction storage 130 by fetch logic 154 and decoded by decode logic 152. Immediate operands may be fetched from the instruction storage 130, since immediate operands generally are grouped with corresponding instructions in the instruction code. The address generation unit 142 may be used to calculate addresses based, at least in part, on data contained in the registers 140. The AGUs 142 may calculate addresses for C-ISA instructions. The AGUs 142 may support parallel data accesses for C-ISA instructions that perform array or other types of processing. The AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104. The decode logic 152 comprises auxiliary registers 151.

Figures 3, 4:
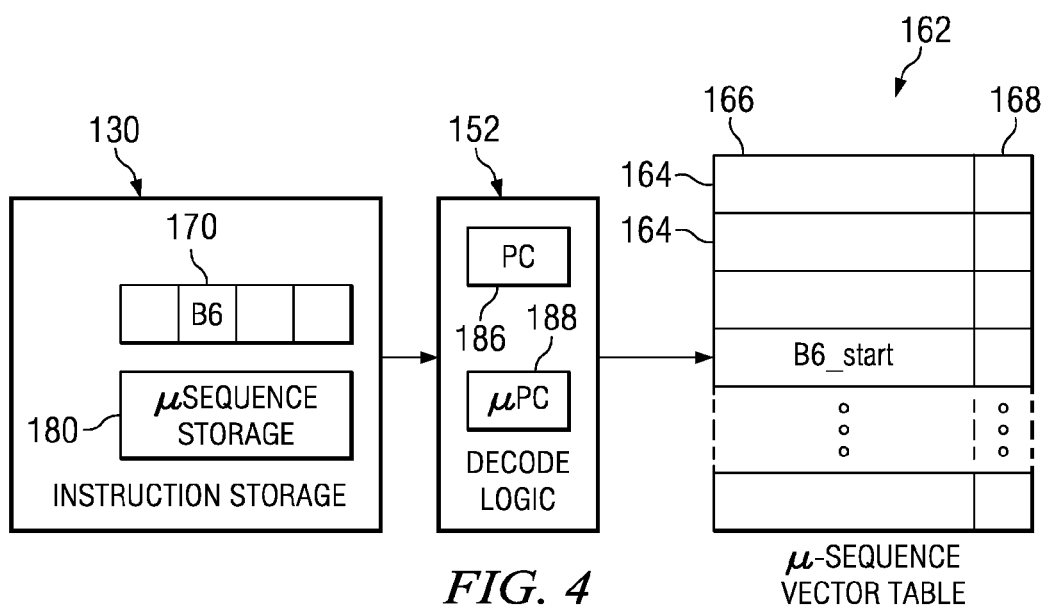
FIG. 3 shows various registers used in the JSM of FIGS. 1 and 2, in accordance with embodiments of the invention.
FIG. 4 shows the operation of the JSM to execute "micro-sequences," in accordance with embodiments of the invention.

Referring now to FIG. 3, the registers 140 may include 16 registers designated as R0-R15. In some embodiments, registers R0-R5 and R8-R14 may be used as general purposes ("GP") registers usable for any purpose by the programmer. Other registers, and some of the GP registers, may be used for specific functions. For example, in addition to use as a GP register, register R5 may be used to store the base address of a portion of memory in which Java local variables may be stored when used by the current Java method. The top of the micro-stack 146 can be referenced by the values in registers R6 and R7. The top of the micro-stack 146 has a matching address in external memory pointed to by register R6. The values contained in the micro-stack 146 are the latest updated values, while their corresponding values in external memory may or may not be up to date. Register R7 provides the data value stored at the top of the micro-stack 146. Register R15 may be used for status and control of the JSM 102. At least one bit (called the "Micro-Sequence-Active" bit) in status register R15 is used to indicate whether the JSM 102 is executing a simple instruction or a complex instruction through a micro-sequence. This bit controls, in particular, which program counter is used (PC or μPC) to fetch the next instruction, as will be explained below.

Referring again to FIG. 2, as noted above, the JSM 102 is adapted to process and execute instructions from at least two instruction sets, at least one having instructions from a stack-based instruction set (e.g., Java). The stack-based instruction set may include Java Bytecodes. Unless empty, Java Bytecodes may pop data from and push data onto the micro-stack 146. The micro-stack 146 preferably comprises the top n entries of a larger stack that is implemented in data storage 122. Although the value of n may vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and data random access memory ("DRAM") 126. Reference may be made to U.S. Pat. No. 6,826,652, filed Jun. 9, 2000 and U.S. Pat. No. 6,792,508, filed Jun. 9, 2000, both incorporated herein by reference. Reference also may be made to U.S. Ser. No. 09/932,794 (Publication No. 20020069332), filed Aug. 17, 2001 and incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAM 132 may be used for "complex" micro-sequenced Bytecodes or micro-sequences, as described below. The I-cache 134 may be used to store other types of Java Bytecode and mixed Java/C-ISA instructions.

As noted above, the C-ISA instructions generally complement the standard Java Bytecodes. For example, the compiler 110 may scan a series of Java Bytecodes 112 and replace the execution of a complex Bytecode with the execution of a micro-sequence as explained previously. The micro-sequence may be created to optimize the function(s) performed by the replaced complex Bytecodes.

FIG. 4 illustrates the operation of the JSM 102 to replace the execution of Java Bytecodes with the execution of micro-sequence instructions. FIG. 4 shows some, but not necessarily all, components of the JSM. In particular, the instruction storage 130, the decode logic 152, and a micro-sequence vector table 162 are shown. The decode logic 152 receives instructions from the instruction storage 130 and accesses the micro-sequence vector table 162. In general and as described above, the decode logic 152 receives instructions (e.g., instructions 170) from instruction storage 130 via instruction fetch logic 154 (FIG. 2) and decodes the instructions to determine the type of instruction for subsequent processing and execution. In accordance with the preferred embodiments, the JSM 102 either executes the Bytecode from instructions 170 or replaces the execution of a Bytecode from instructions 170 with the execution of a micro-sequence as described below.

The micro-sequence vector table 162 may be implemented in the decode logic 152 or as separate logic in the JSM 102. The micro-sequence vector table 162 preferably includes a plurality of entries 164. The entries 164 may include one entry for each Bytecode that the JSM may receive. For example, if there are a total of 256 Bytecodes, the micro-sequence vector table 162 preferably comprises at least 256 entries. Each entry 164 preferably includes at least two fields—a field 166 and an associated field 168. The associated field 168 may comprise a single bit that indicates whether the instruction 170 is to be directly executed or whether the field 166 contains a reference to a micro-sequence. For example, a bit 168 having a value of "0" ("not set") may indicate the field 166 is invalid and thus, the corresponding Bytecode from instructions 170 is directly executable by the JSM. Bit 168 having a value of "1" ("set") may indicate that the field 166 contains a reference to a micro-sequence.

If the bit 168 indicates the field 166 includes a reference to a micro-sequence, the reference may comprise the full starting address in instruction storage 130 of the micro-sequence or a part of the starting address that can be concatenated with a base address that may be programmable in the JSM. In the former case, field 166 may provide as many address bits as are required to access the full memory space. In the latter case, a register within the JSM registers 140 is programmed to hold the base address and the vector table 162 may supply only the offset to access the start of the micro-sequence. Most or all JSM internal registers 140 and any other registers preferably are accessible by the main processor unit 104 and, therefore, may be modified by the JVM as necessary. Although not required, this latter addressing technique may be preferred to reduce the number of bits needed within field 166. At least a portion 180 of the instruction 130 may be allocated for storage of micro-sequences and thus the starting address may point to a location in micro-sequence storage 130 at which a particular micro-sequence can be found. The portion 180 may be implemented in I-RAM 132 shown above in FIG. 2.

In operation, the decode logic 152 uses a Bytecode from instructions 170 as an index into micro-sequence vector table 162. Once the decode logic 152 locates the indexed entry 164, the decode logic 152 examines the associated bit 168 to determine whether the execution of the Bytecode is to be replaced by the execution of a micro-sequence. If the bit 168 indicates that the Bytecode can be directly processed and executed by the JSM, then the instruction is so executed. If, however, the bit 168 indicates that the execution of the Bytecode is to be replaced by the execution of a micro-sequence, then the decode logic 152 preferably changes this instruction into a "no operation" (NOP) and sets the micro-sequence-active bit (described above) in the status register R15. In another embodiment, the JSM's pipe may be stalled to fetch and replace this micro-sequenced instruction by the first instruction of the micro-sequence. Changing the micro-sequenced Bytecode into a NOP while fetching the first instruction of the micro-sequence permits the JSM to process multi-cycle instructions that are further advanced in the pipe without additional latency. The micro-sequence-active bit may be set at any suitable time such as when the micro-sequence enters the JSM execution stage (not specifically shown).

As described above, the JSM 102 implements two program counters—the PC and the μPC. The PC and the μPC are stored in auxiliary registers 151, which in turn is stored in the decode logic 152. In accordance with a preferred embodiment, one of these two program counters is the active program counter used to fetch and decode instructions. The PC 186 may be the currently active program counter when the decode logic 152 encounters a Bytecode, the execution of which is to be replaced by the execution of a micro-sequence. Setting the status register's micro-sequence-active bit causes the micro-program counter 188 to become the active program counter instead of the program counter 186. Also, the contents of the field 166 associated with the micro-sequenced Bytecode preferably are loaded into the μPC 188. At this point, the JSM 102 is ready to begin fetching and decoding the instructions comprising the micro-sequence. At or about the time the decode logic begins using the μPC 188, the PC 186 preferably is incremented by a suitable value to point the PC 186 to the next instruction following the Bytecode whose execution is replaced by that of the micro-sequence. In at least some embodiments, the micro-sequence-active bit within the status register R15 may only be changed when the first instruction of the micro-sequence enters the execute phase of JSM 102 pipe. The switch from PC 186 to the μPC 188 preferably is effective immediately after the micro-sequenced instruction is decoded, thereby reducing the latency.

The micro-sequence may end with a predetermined value or Bytecode from the C-ISA called "RtuS" (return from micro-sequence) that indicates the end of the sequence. This C-ISA instruction causes a switch from the μPC 188 to the PC 186 upon completion of the micro-sequence. Preferably, the PC 186 previously was incremented, as discussed above, so that the value of the PC 186 points to the next instruction to be decoded. The instruction may have a delayed effect or an immediate effect depending on the embodiment that is implemented. In embodiments with an immediate effect, the switch from the μPC 188 to the PC 186 is performed immediately after the instruction is decoded and the instruction after the RtuS instruction is the instruction pointed to by the address present in the PC 186.

As discussed above, the execution of one or more Bytecodes may be replaced with the execution of a micro-sequence or a group of other instructions. Such replacement instructions may comprise any suitable instructions for the particular application and situation at hand. At least some such suitable instructions are disclosed in U.S. Ser. No. 10/631,308 (Publication No. 20040024989), filed Jul. 31, 2003 and incorporated herein by reference.

Often, instructions replaced by micro-sequences require operands to perform a particular task. These instructions generally retrieve operands from one or more registers 140. However, some instructions require operands located in the I-cache 134 instead of in one of the registers 140. These operands are immediate operands. Because the micro-sequence performs the same or a similar task as the instruction(s) it replaces, if the replaced instruction(s) requires a particular operand, the micro-sequence also will require the operand which, as previously mentioned, may be stored in the I-cache 134. Access to the I-cache 134 is restricted to the fetch logic 154 because making the I-cache 134 available to additional components of the JSM 102 is associated with an increase in circuit complexity and cost. As such, a micro-sequence instruction cannot retrieve immediate operands that are located in the I-cache 134. As the micro-sequence attempts to find a required immediate operand in the registers 140, the D-cache 124 is queried for the operand. Because the D-cache 124 does not contain the operand, a cache miss occurs, and a cache line is loaded from the main memory 106 in order to obtain the necessary operand. Loading a cache line from the memory 106 is inefficient in that it consumes excessive time and power.

Figure 5:
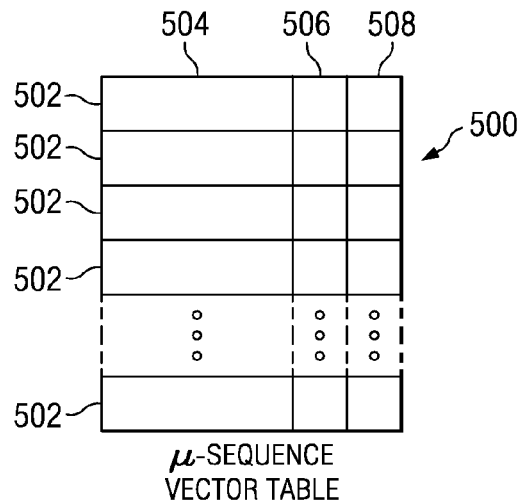
FIG. 5 shows a data structure used to load operands, in accordance with preferred embodiments of the invention.

Accordingly, in some embodiments, a modified micro-sequence vector table 500 (shown in FIG. 5) that avoids such problems may be used instead of the micro-sequence vector table 162 previously described. The structure and usage of the vector table 500 is similar to that of the vector table 162, with the exception of an additional field in the table 500, described further below. The vector table 500 may be implemented in the decode logic 152 or as separate logic in the JSM 102. The vector table 500 preferably includes a plurality of entries 502. The entries 502 may include one entry for each Bytecode that the JSM may receive. For example, if there are a total of 256 Bytecodes, the vector table 500 preferably comprises at least 256 entries. Each entry 502 preferably includes at least three fields—a field 504 and associated fields 506 and 508. Field 506 may comprise a single bit that indicates whether the instruction 170 is to be directly executed or whether the field 504 contains a reference to a micro-sequence. For example, a bit 506 having a value of "0" may indicate the field 504 is invalid and thus, the corresponding Bytecode from instructions 170 is directly executable by the JSM. A bit 506 having a value of "1" may indicate that the field 504 contains a reference to a micro-sequence. The vector table 500 preferably is loaded and modified in a manner similar to that in which the vector table 162 is loaded and modified.

As mentioned above, in case the bit 506 of an entry 502 contains a "1," the execution of the corresponding Bytecode is to be replaced with the execution of an associated micro-sequence. The field 508 indicates whether this micro-sequence requires an immediate operand. More specifically, when the decode logic 152 processes a Bytecode, the decode logic 152 first refers to the entry 502 in the vector table 500 that corresponds to the Bytecode. The decode logic 152 determines the status of the bit 506 of this entry 502. If the status of the bit 506 indicates that the Bytecode has a corresponding micro-sequence, then the decode logic 152 further determines the status of the field 508 to ascertain whether the corresponding micro-sequence requires an immediate operand. If the status of the field 508 indicates that the micro-sequence requires an immediate operand, the decode logic 152 obtains the operand from the I-cache 134 via the instruction fetch logic 154 and stores the operand in one of the auxiliary registers 151 (shown in FIG. 2), preferably a dedicated auxiliary register 151. The decode logic 152 preferably stores the immediate operand in the register 151 prior to invoking the corresponding micro-sequence. In this way, when the micro-sequence is executed, the immediate operand required by the micro-sequence is available in a register 151 to be used by the micro-sequence, thereby preventing a cache miss and avoiding the time and power costs associated therewith.

The field 508 preferably comprises two bits that indicate the size of the immediate operand that is to be retrieved and stored into a register 151. If the bits in field 508 are "0 0," then no operands are to be retrieved for the corresponding micro-sequence. If the bits in field 508 are "0 1," then a single byte is to be retrieved for the corresponding micro-sequence. The single byte is fetched from the I-cache 134 by the decode logic 152 using the instruction fetch logic 154. The single byte then is stored in a dedicated auxiliary register 151 for access by the micro-sequence. Further, because a micro-sequence may not be of the same length as an instruction it replaces, the PC 186 may need to be incremented. The PC 186 preferably is incremented based on the bits in the field 508. Thus, for example, after the single byte is stored, the PC 186 is incremented by one to account for the fetched byte.

If the bits in field 508 are "1 0," then a short word (i.e., two bytes) is to be retrieved for the corresponding micro-sequence. The short word is fetched in a manner similar to the single byte, as described above. After the short word is stored to the appropriate register 151, the PC 186 preferably is incremented by two to account for the fetched short word. Similarly, if the bits in field 508 are "1 1," then a full word (i.e., four bytes) is to be retrieved for the corresponding micro-sequence. The full word is fetched in a manner similar to the single byte and the short word, as described above. After the full word is stored to the appropriate register 151, the PC 186 is incremented by four to account for the fetched full word. The scope of disclosure is not limited to assigning operand sizes to bit combinations as described above, nor is the scope of disclosure limited to using any particular number of bits in the field 508.

Figure 6:
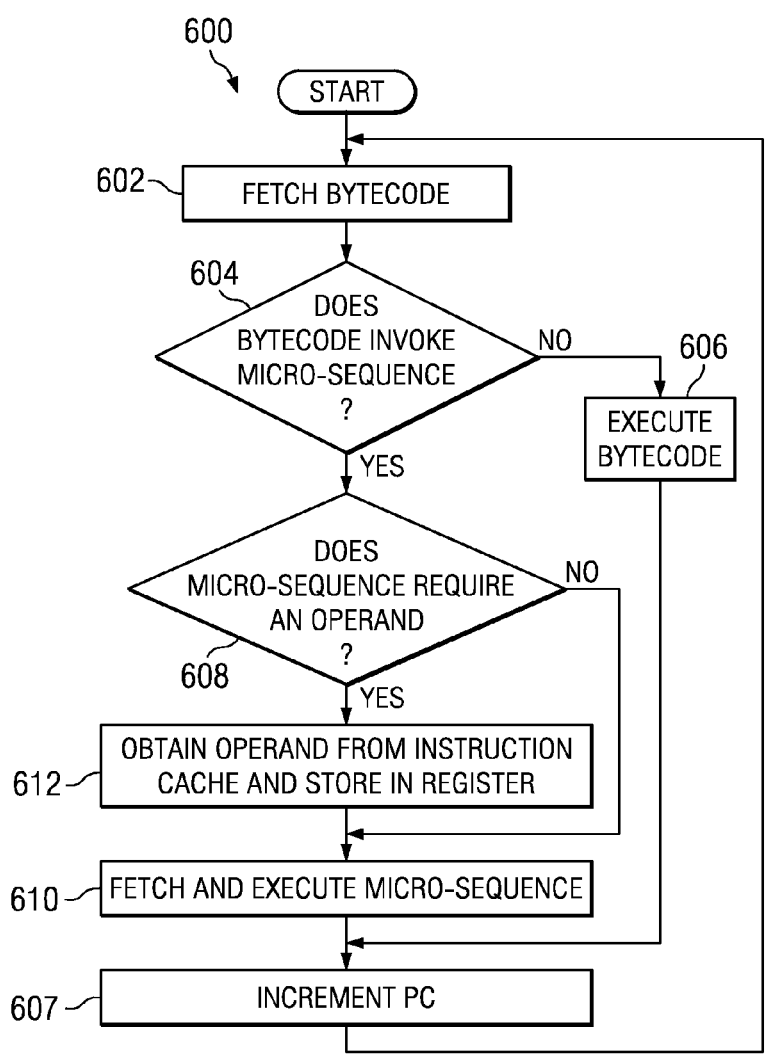
FIG. 6 shows a flow chart describing a method with which the technique described herein may be implemented, in accordance with embodiments of the invention.

FIG. 6 shows a process 600 that may be used to implement the technique described above. The process 600 may begin by fetching a Bytecode from the instructions 170 (block 602). The process 600 then comprises determining, based on the status of the field 506, whether the Bytecode has a corresponding micro-sequence that is to be executed in lieu of the Bytecode (block 604). If the status of the field 506 indicates that there is no such micro-sequence, then the Bytecode is executed in JSM mode (block 606), the PC 186 is incremented based on the size of the operand that is used by the Bytecode (block 607), and the next Bytecode is accessed (block 602). However, if the status of the field 506 indicates that the execution of the Bytecode is to be replaced with the execution of a micro-sequence (block 604), then the process 600 comprises determining whether the micro-sequence requires an immediate operand (block 608).

In case the micro-sequence does not require an immediate operand, the process 600 comprises fetching and executing the micro-sequence in C-ISA mode (block 610) and then incrementing the PC 186 (block 607). If the micro-sequence did not require an operand (block 608), then the PC 186 is incremented by one in block 607. However, if the micro-sequence did require an operand (block 608), then the PC 186 is incremented based on the size of the operand as specified by the bits in the field 508 (block 607). After execution of the micro-sequence is complete, the process 600 comprises accessing the next Bytecode (block 602). However, in case the micro-sequence does require an immediate operand (block 608), the process 600 comprises fetching the operand from the I-cache 134 using the decode logic 152 and the instruction fetch logic 154, and then storing the operand to the appropriate register 151, such as a dedicated auxiliary register 151 (block 612). As described above, the size of the immediate operand fetched is dependent upon the bit combination in the field 508, and the PC 186 is incremented accordingly. After the immediate operand has been stored to the appropriate register 151, the process 600 comprises fetching and executing the micro-sequence in C-ISA mode (block 610). Because the immediate operand(s) required by the micro-sequence are present in the appropriate register 151 before the micro-sequence is executed, no cache misses occur for operand fetches upon execution of the micro-sequence, thus improving processor efficiency and power consumption over processors that do not use the technique described herein.

Figure 7:
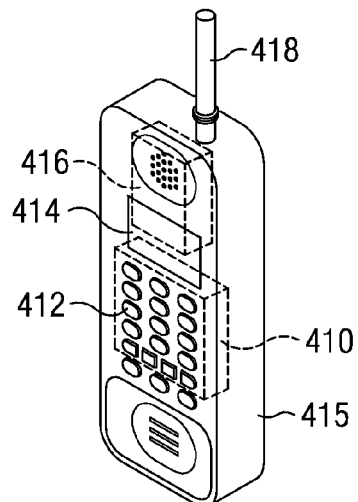
FIG. 7 shows an exemplary embodiment of the system described herein.

System 100 may be implemented as a mobile cell phone 415 such as that shown in FIG. 7. As shown, the mobile communication device includes an integrated keypad 412 and display 414. The JSM processor 102 and MPU processor 104 and other components may be included in electronics package 410 connected to the keypad 412, display 414, and radio frequency ("RF") circuitry 416. The RF circuitry 416 may be connected to an antenna 418.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A processor, comprising:
   decode logic coupled to an instruction cache;
   a micro-sequence vector table coupled to the decode logic, wherein the micro-sequence vector table comprises an entry for each bytecode in an instruction set of the processor; and
   a register coupled to said decode logic, wherein the register is dedicated for storage of an immediate operand of a bytecode,
   wherein the decode logic is configured to:
      obtain a single bytecode from the instruction cache, wherein the single bytecode requires an immediate operand stored in the instruction cache,
      use the single bytecode to locate an entry corresponding to the single bytecode in the micro-sequence vector table, wherein a size of the immediate operand is indicated by bits in the entry, and
      when indicated by information in the entry, obtain the immediate operand from the instruction cache and store the immediate operand in the register for use by a micro-sequence that is executed in lieu of the single bytecode,
      wherein the information in the entry comprises an indicator set to indicate that the micro-sequence is to be executed in lieu of the single bytecode and an indicator set to indicate that the immediate operand is to be obtained.

2. The processor of claim 1, wherein the size of the immediate operand is selected from a group consisting of one byte, two bytes and four bytes.

3. The processor of claim 1, wherein the decode logic is further configured to obtain and store the immediate operand before the micro-sequence is executed.

4. The processor of claim 1, wherein the entry comprises a field storing a reference to the micro-sequence, a bit indicating whether the single bytecode is to be executed or the micro-sequence is to be executed, and a field indicating that the immediate operand is to be obtained.

5. The processor of claim 1, wherein a program counter is incremented according to the size of the immediate operand, said program counter used by the decode logic when processing bytecodes.

6. An electronic device, comprising:
decode logic coupled to an instruction cache and a register dedicated for storage of an immediate operand of a bytecode; and
a micro-sequence vector table comprising a plurality of entries, wherein each entry of the plurality of entries corresponds to a bytecode in an instruction set and each entry comprises:
a first field indicating whether a micro-sequence is to be processed in lieu of the corresponding bytecode; and
a second field indicating whether an immediate operand is required by the corresponding bytecode, wherein the second field indicates a size of the immediate operand;
wherein the decode logic is configured to:
use a bytecode to locate an entry corresponding to the bytecode in the micro-sequence vector table, and obtain an immediate operand from the instruction cache and store the immediate operand in the register for use by the micro-sequence when the first field in the entry indicates that the micro-sequence is to be processed and the second field in the entry indicates that the immediate operand is required.

7. The electronic device of claim 6, wherein the electronic device is selected from the group consisting of a battery-operated device and a wireless communication device.

8. The electronic device of claim 6, wherein the size of the immediate operand is selected from a group consisting of one byte, two bytes and four bytes.

9. The electronic device of claim 6, wherein a program counter used by the decode logic to process instructions is incremented based on the size of the immediate operand.

10. The electronic device of claim 6, wherein the decode logic is further configured to store the immediate operand before the micro-sequence is executed.

11. The electronic device of claim 6, wherein each entry further comprises a third field comprising a reference to the micro-sequence.

12. A method, comprising:
fetching a single bytecode from an instruction cache, wherein the single bytecode requires an immediate operand stored in the instruction cache;
using the single bytecode to locate an entry corresponding to the single bytecode in a micro-sequence vector table, wherein the micro-sequence vector table comprises an entry for each bytecode in an instruction set of a processor; and
when a first field in the entry indicates that a micro-sequence is to be executed in lieu of the single bytecode and a second field in the entry indicates that the single bytecode requires the immediate operand,
obtaining the immediate operand from the instruction cache, wherein a size of the immediate operand is indicated by the second field; and
storing the immediate operand in a register for use by the micro-sequence, wherein the register is dedicated for storage of an immediate operand of a bytecode.

13. The method of claim 12, wherein the size of the immediate operand is selected from a group consisting of one byte, two bytes and four bytes.

14. The method of claim 12, wherein storing the immediate operand further comprises storing the immediate operand before the micro-sequence is executed.

15. The method of claim 12, wherein a third field in the entry stores a reference to the micro-sequence.

16. The method of claim 12 further comprising executing the micro-sequence, wherein the immediate operand stored in the register is accessed.

* * * * *